United States Patent [19]

Kemp

[11] 4,228,762

[45] Oct. 21, 1980

[54] GROWTH SYSTEM FOR CRUSTACEANS AND FISH

[76] Inventor: James M. Kemp, P.O. Box 5623, Phoenix, Ariz. 85010

[21] Appl. No.: 49,172

[22] Filed: Jun. 18, 1979

[51] Int. Cl.³ .................. A01K 61/00; A01K 80/00
[52] U.S. Cl. ........................................... 119/2; 119/3
[58] Field of Search ................................. 119/2, 3, 4

[56] References Cited

U.S. PATENT DOCUMENTS

| | | | |
|---|---|---|---|
| 3,116,712 | 1/1964 | Ogden et al. | 119/3 |
| 3,166,043 | 1/1965 | Castillo | 119/3 |
| 3,797,458 | 3/1974 | Day et al. | 119/2 |
| 3,889,639 | 6/1975 | Day et al. | 119/2 |

*Primary Examiner*—Hugh R. Chamblee
*Attorney, Agent, or Firm*—Warren F. B. Lindsley

[57] ABSTRACT

A system of breeding, growth tanks and processing areas for commercial raising and harvesting of giant fresh water prawn, shrimp and other crustaceans including fish, the growth or rearing tanks comprising a novel arrangement of artificial reefs with special equipment provided for the culling and harvesting of the crustaceans and fish as they mature.

6 Claims, 8 Drawing Figures

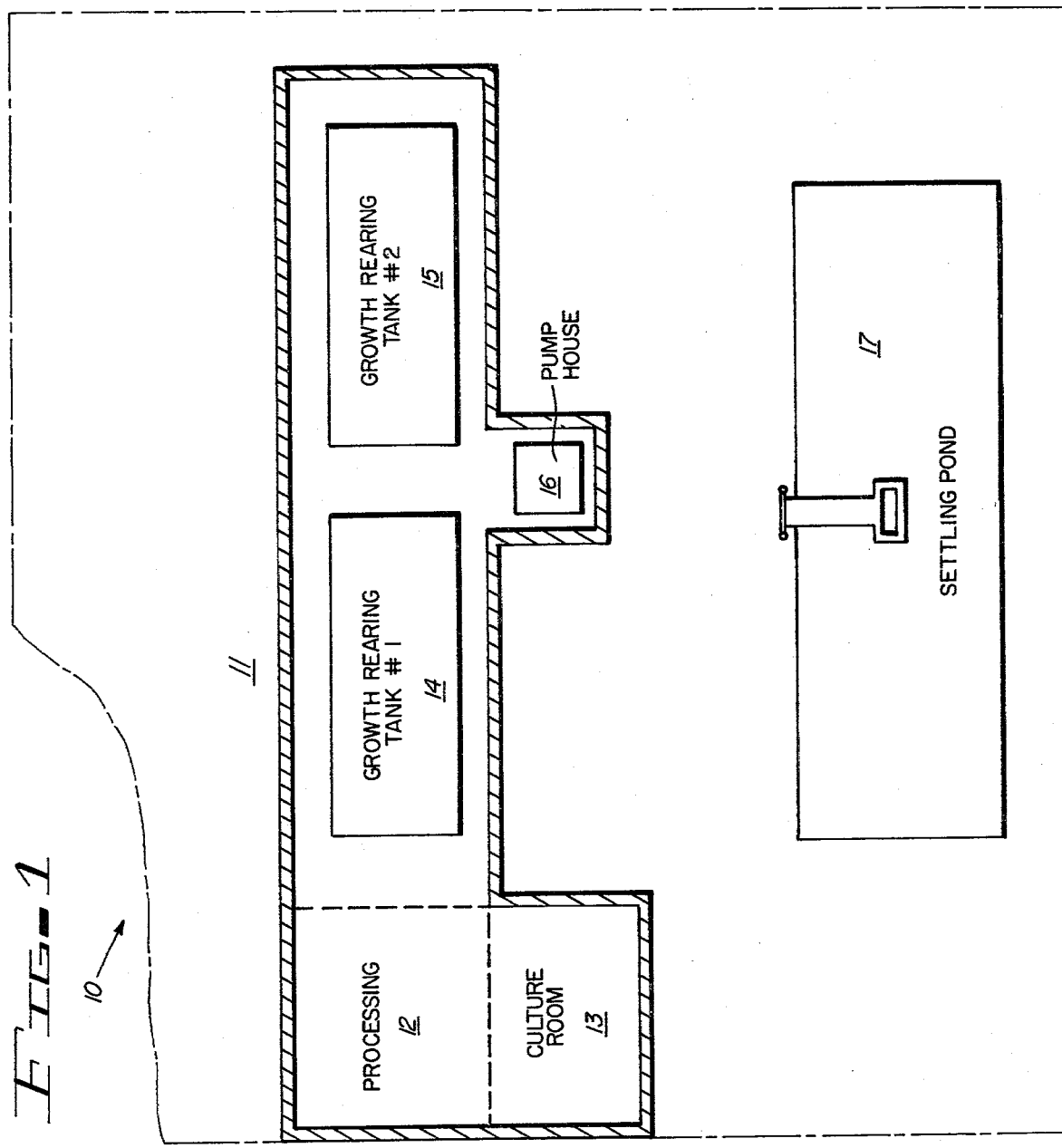
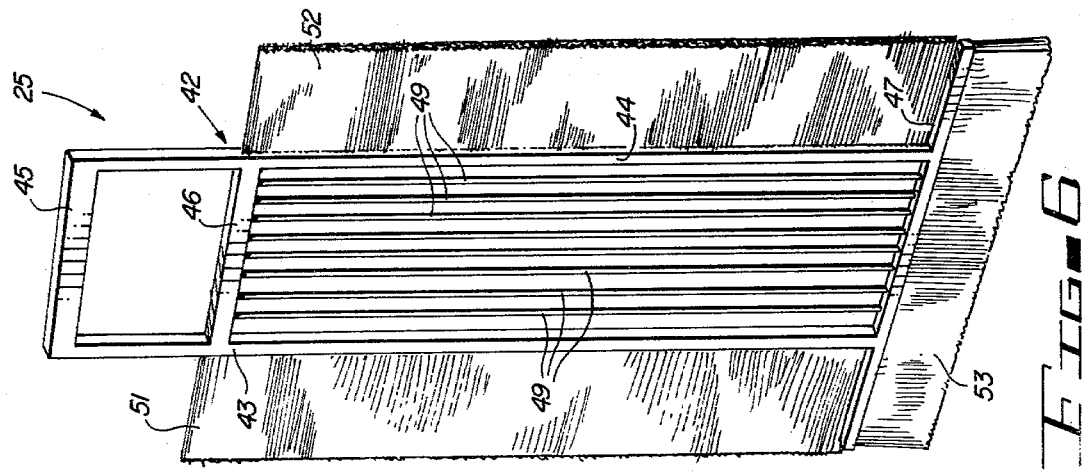

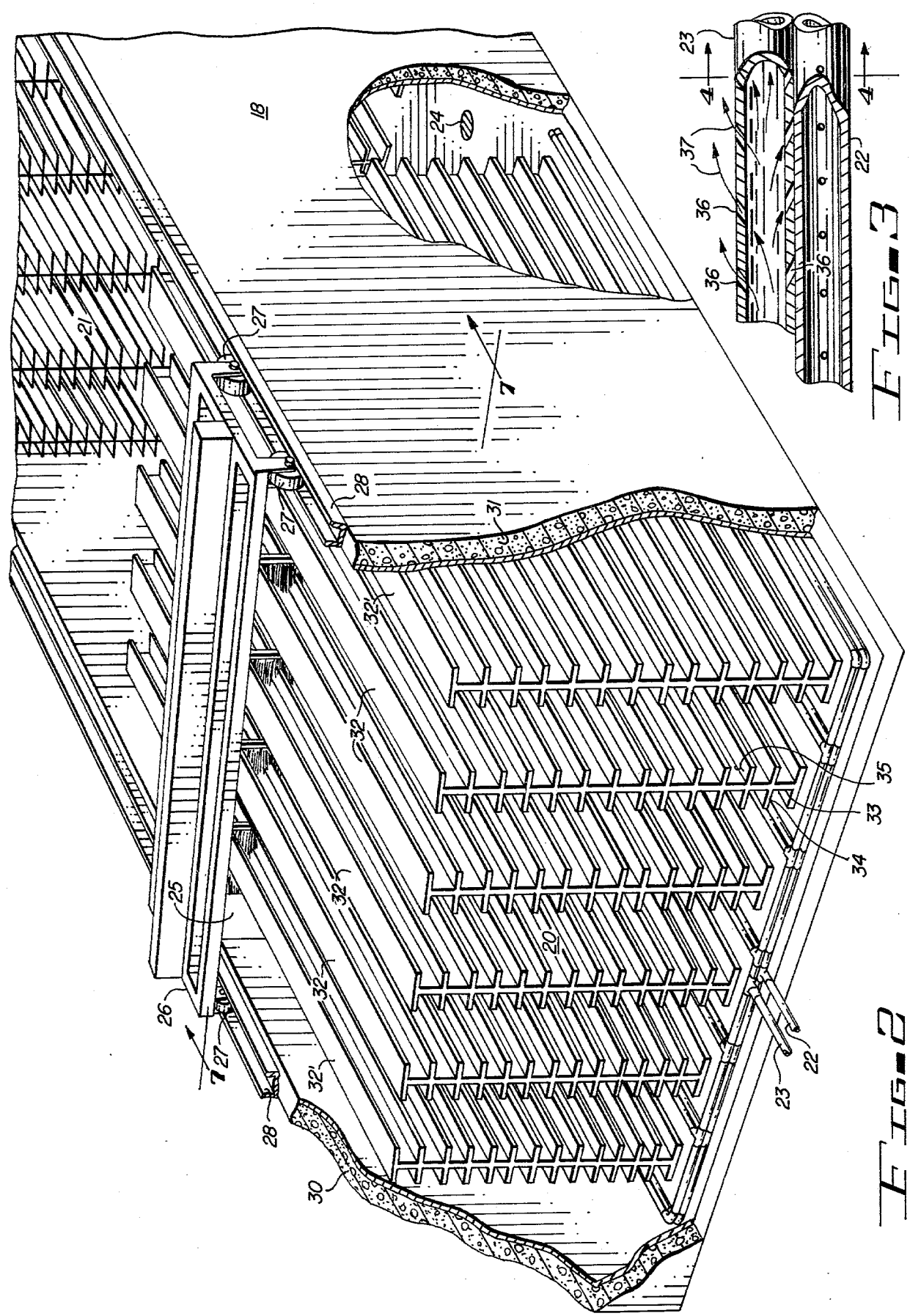

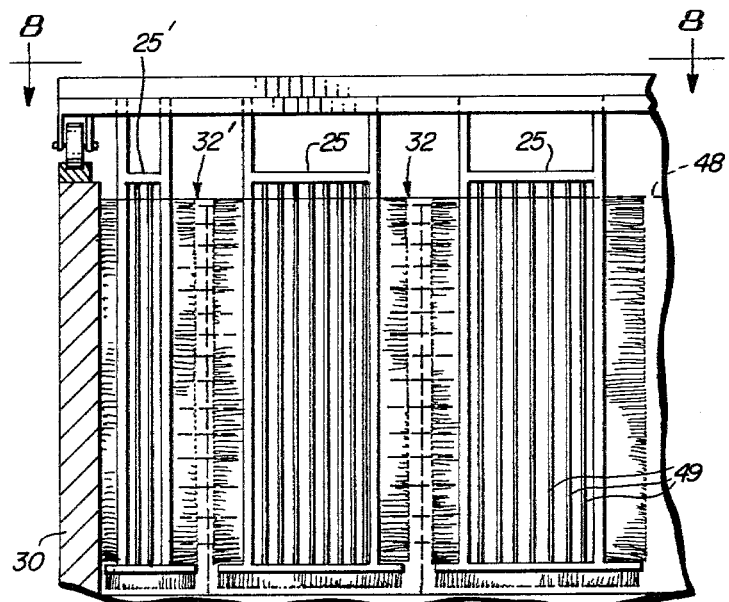
FIG-7
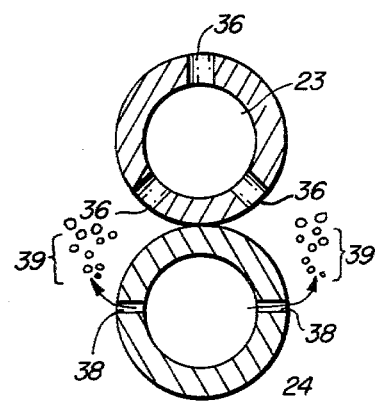
FIG-4
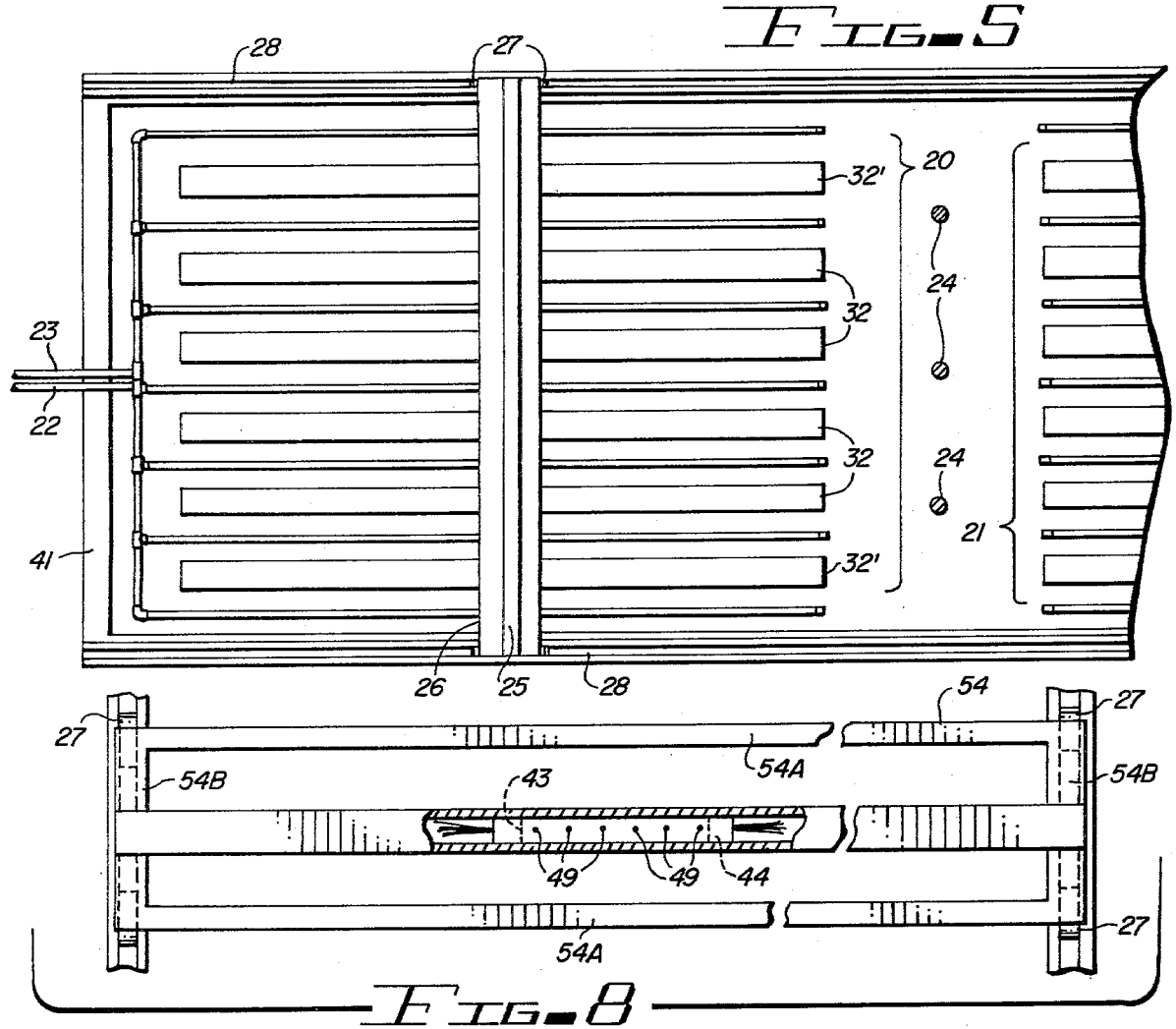
FIG-5
FIG-8

GROWTH SYSTEM FOR CRUSTACEANS AND FISH

BACKGROUND OF THE INVENTION

As the world food supply is taxed more and more by the expanding world population and as spreading famines and the fear of still greater food shortages become more prevalent, much attention is being given to the development of more efficient and productive sources for generating large quantities of food.

One important source of food is the ocean to which man has looked for food since the beginning of civilization. In recent years, there has been a growing competition between nations for fishing areas where the supply of available sea life for this purpose is beginning to dwindle relative to the growing demand.

While seafood has been consumed primarily by localities having ready access to the sea, recent advances in food processing and preserving such as freezing have brought about a dramatic change in seafood consumption, especially in the United States where sea foods are now popular across the entire country. This new popularity of seafood is particularly evidenced in the rapidly expanding consumption of shrimp in this country which reached a level of one million pounds per day in 1973 and has been increasing ever since then.

Because of this growing demand for new food resources and in particular because of the rapidly increasing consumption of shrimp in the United States as the supply becomes increasingly less adequate, it is highly desirable that methods and equipment be developed for increasing the annual harvest of shrimp.

SUMMARY OF THE INVENTION

In accordance with the invention claimed, a system and the associated equipment are provided for the breeding, growing and harvesting of shrimp and especially of giant freshwater Malaysian prawn which makes practical on a commercial scale the inland production of this important food resource.

It is, therefore, one object of this invention to provide an inland system for the breeding, development, growth and harvesting on a commercial scale of prawn and other crustaceans.

Another object of this invention is to provide in such a system the means for maximizing the annual production in pounds per acre of land covered by the system.

A further object of this invention is to provide in such a system suitable means and equipment for the enhancement of the breeding and growth environment for crustaceans and fish including an adequate fresh water supply, filtering and aeration thereof and shelter for creatures from the direct rays of the sun.

A still further object of this invention is to provide as a part of such a system new and efficient means and equipment for the accomplishment with a minimum of manpower of the necessary sorting, grading and harvesting operations.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing, in which:

FIG. 1 is a plan view of the prawn growth system;

FIG. 2 is a cut-away perspective view of the prawn growth tank which constitutes a central element of this invention;

FIG. 3 is a cut-away view of the water and air distribution ducts employed in the growth tank of FIG. 2;

FIG. 4 is a cross-sectional view of the water and air ducts of FIG. 3 taken along line 4—4 of FIG. 3;

FIG. 5 is a plan view of the bottom of the growth tank of FIG. 2 showing the distribution of the water and air ducts over the bottom surface of the tank;

FIG. 6 is a perspective view of a special device provided for the sorting and collecting of prawn for use in growing and harvesting operations;

FIG. 7 is a cross-sectional view of the growth tank of FIG. 2 taken along line 7—7 of FIG. 2 showing the special device of FIG. 6 being utilized in a sorting and collecting operation; and FIG. 8 is a top view of the sorting and collecting device of FIG. 7, the view taken along line 8—8 of FIG. 7.

DESCRIPTION OF THE PREFERRED EMBODIMENT

Referring more particularly to the drawing by characters of reference, FIG. 1 discloses a pilot or developmental version of the prawn growth system 10, the system comprising a control center 11 with its processing area 12 and its culture room 13, a first growth and rearing tank 14, a second growth and rearing tank 15, a pump house 16 and a settling pond 17. A roof may shelter the control center 11, the growth tanks 14 and 15 and the pump house 16 from the sun and other elements of the weather.

The culture room 13 houses a pre-growth tank, (not shown) in which the barred female prawns lay their eggs in saline water which is held at a temperature of 80 degrees Fahrenheit. In the pilot system of FIG. 1 the pre-growth tank is approximately four feet square and eighteen inches deep and it is equipped with artificial reef structures of a type which will be described later in connection with growth tanks 14 and 15. As in her natural habitat, the female shrimp or prawn lays her round eggs directly into the water, laying as many as 500,000 to 1,000,000 eggs in a single spawning. The eggs drop to the bottom of the tank and hatch in about 24 hours. After hatching the shrimp goes through 10 larval stages before reaching adulthood. During most of this time the larval shrimp are very small and hardly visible to the naked eye, they are capable of very little movement and are carried about by water currents. To promote the hatching and survival of a reasonable percentage of the larval shrimp through their development to the juvenile stage, the salinity and the temperature of the water in the pre-growth tank are carefully controlled.

After development through the larval stages, juvenile shrimp are collected from the pre-growth tank by means of a sorting and collecting device to be described later and are placed in the first growth and rearing tank 14 where they are kept until they reach a length of approximately two inches.

The two inch prawns are then transferred to the second growth and rearing tank 15 where they are kept until reaching harvesting size which is about four inches long.

Each of the growth and rearing tanks 14 and 15 are approximately 50 feet long, 20 feet wide and three feet deep, and are equipped with two sets of artificial reefs with a separation in the center of the tank for use in the harvesting operation. A system of air and water pipes or ducts in the bottom of the tank provides aeration and a supply of fresh water, the air and water being supplied by equipment located in pump house 16.

As fresh water is pumped into tanks 14 and 15 and into the pre-growth tank located in culture room 13, the stale water is delivered to the settling pond 17. Pond 17 is used for holding live clams which will be used as part of the feed for the growing prawns.

The structure of the growth and rearing tanks 14 and 15, as shown in FIG. 2, includes an open-top rectangular box-like enclosure 18 which is made of concrete block with a plastered surface to make it water tight, two sets of artificial reefs, 20 and 21, an air ducts system 22, a water duct system 23, water drains 24, and a number of harvesting devices 25 suspended from a carrier 26 which is supported by rollers 27 which travel inside channel-shaped tracks 28 located on top and running the full length of the two longer vertical side walls 30 and 31 of enclosure 18.

Each of the two sets of artificial reefs 20 and 21 are comprised of six individual artificial reef structures 32. Each individual reef structure 32 has a central vertical plane 33 as a central support which holds a large number of horizontal shelves 34 equally spaced one above the other from the bottom to the top of plane 33, the shelves extending perpendicularly from both sides of plane 33 thereby providing on each side of plane 33 a large number of sheltered nooks 35. In the exemplification shown in FIG. 2 there are 13 individual nooks 35 on each side of each reef structure 32 formed by 14 individual shelves 34.

As in its natural habitat, the prawn is very possessive of what it claims as its home territory. It very quickly adopts a particular spot somewhere along the length of one of these nooks 35 and will fight to maintain its claim over that particular spot. The design of the reef structure 32 with its many shelves 34 achieves the affect of multiplying by many times the useful homing area for prawns within the limited horizontal boundaries of the enclosure 18. Furthermore, the shelf-like design of the artifical reef structures 32 and their arrangement side-by-side provides as an added benefit protection from the direct rays of the sun. Finally, the structure of the artificial reefs is specially designed to be compatible with the harvesting device 25. This compatibility will become apparent later when the harvesting device is described in detail.

The air ducts 22 and the water ducts 23 are distributed over the base of the enclosure 18 in a grid or network of parallel lines running lengthwise alongside the artificial reef structures 32 so that between adjacent reef structures and also between each of the outside reef structures 32' and the side walls 30 or 31 there is one air ducts 22 and one water duct 23 the water duct lying directly above the air duct.

The special design of the air ducts and of the water ducts is shown in FIGS. 3 and 4. The cylindrical water ducts 23 are perforated by a series of holes 36 which pierce the walls of the water ducts at an angle of 30 degrees. Because of the 30 degree angle the water 37 leaving the duct through the holes 36 creates a horizontal current flowing toward the center of enclosure 18 and toward the drain holes 24. The holes 38 in the walls of the air ducts 22, on the other hand, pierce the walls of the air ducts perpendicularly and are directed horizontally to both sides of the ducts 22. Air bubbles 39 emitted by the holes 38 rise vertically alongside the reef structure 32 creating an upward current of aerated fresh water to the prawns occupying their selected nooks 35 in the artificial reefs.

The grid or network of air and water ducts, 22 and 23, is illustrated more clearly in FIG. 5 where it is seen to resemble a many-tined fork wherein the parallel distribution lines represent the tines of the fork with the artificial reef structures 32 positioned between the tines. In FIG. 5, the water current flow for artificial reef section 20 is predominantly from end wall 41 toward the drain holes 24. For artificial reef section 21 the flow is from the end wall opposite wall 41 again toward drain holes 24.

The construction of the harvesting devices 25 and of carrier 26 is shown more clearly in FIGS. 6, 7 and 8.

Harvesting device 25 is a comb-like structure having a rectangular frame 42 comprising two parallel vertical members 43 and 44 and three parallel horizontal members 45, 46, and 47. The vertical members extend from approximately one foot above the water line 48 to a point just a few inches above the bottom of the enclosure 18. The lengths of each of the two upper members 45 and 46 is equal to the separation between vertical members 43 and 44, and member 45 joins the tops of members 43 and 44 while member 46 joins members 43 and 44 just above the water line 48. Horizontal member 47 is attached perpendicularly to the lower extremities of members 43 and 44 and extends a few inches past members 43 and 44 on both sides thereof. Members 43, 44, 46 and 47 thus form a rectangular window and the window thus formed is closed by a grid of vertical rods 49 which are attached at their upper ends to member 46 and at their lower ends to member 47. The rods 49 are equally spaced along members 46 and 47 the spacing between rods being made appropriate to permit prawns below a given size to pass between the rods, the grids thus serving as a sorting or grading means for separating larger prawns from smaller ones.

In addition to the rods 49, frame 42 also supports three sets of bristles or brushes 51, 52, and 53. The first set of brushes 51 extends horizontally outward from member 43, the second set 52 extends horizontally outward from member 44, and the third set 53 extends vertically downward from member 47, each of the three sets comprising a series of bristles lying in the plane of frame 42. Sets 51 and 52 extend from the junction of member 46 with members 43 and 44 to the lower extremities of members 43 and 44 while set 53 extends the full length of member 47 the three sets of bristles thus forming a flexible comb-like fringe around the entire submerged portion of frame 42.

As shown most clearly in FIG. 7 a number of such harvesting devices 25 are suspended from carrier 26 with one device 25 being positioned between each pair of adjacent reefs 32 and with a somewhat narrower device 25' being positioned between the outermost reef 32' and side wall 30 or 31. The overall width of the device 25 or 25' and the lengths of the bristles of sets 51 and 52 are appropriate to cause the bristles to brush lightly against vertical plane 33 of artificial reefs 32, 32'.

Carrier 26 comprises a horizontal rectangular frame 54, its longer sides 54A spanning the distance between walls 30 and 31 and its shorter sides 54B being just long enough to provide vertical stability. In addition, frame 54 comprises a central horizontal support member 55 running parallel to the two longer sides of frame 54 and spaced equidistant therebetween and attached at its ends to the top center points of the two shorter members. Member 55 is channel-shaped in cross-section, the channel opening downwardly with a channel width dimension appropriate to receive the thicker dimension of the upper end of frame 42 of harvesting devices 25. The harvesting devices 25 are thus suspended from inside the channel opening of member 55 and are secured therein by bolts or by welding.

By virtue of the four rollers 27 attached at the four corners of frame 54 which ride inside tracks 28 along the tops of walls 30 and 31 it is thus possible to move carrier 26 from a starting point at one end of enclosure 18 toward the center of enclosure 18, and in the process to sweep the prawns from their positions along the shelves 34 of the artificial reefs 32. At the same time the third set of bristles 53 sweeping over air and water ducts 22 and 23 prevent prawns from escaping below device 25. As the prawns are thus forcably removed from their chosen positions they will attempt to return through the gaps between the vertical rods 49 of the harvesting device 25 as its moves slowly toward the center. Only the smaller prawns below the sorting dimension will succeed in passing through, however, and the larger prawns will be carried to the center of the tank 14 or 15 where they may be collected in buckets for harvesting or for transfer to another growing tank.

Similar appropriately-dimensioned harvesting devices 25 are employed for sorting and collection of prawns in the pre-growth tank located in culture room 13 and in the growth and rearing tanks 14 and 15. A miniature device 25 is employed in the pre-growth tank as a means for sorting and collection for transfer to tank 14. In tank 14, the device 25 is employed in the sorting and collection of prawns two inches and larger for transfer to tank 15, and in tank 15 the device 25 is employed for the sorting and collection of prawns four inches and larger for harvesting. By this means of selective capture, it is possible to conduct a harvest every thirty days.

A practical and workable system for growing and harvesting shrimp or prawns or other crustaceans is thus provided in which ideal growing conditions encourage fast growth in high-density concentrations. The system is automated to permit operation with a minimum manpower requirement. These and other objects of the invention have been met and demonstrated in pilot operations conducted in Arizona. The pilot operations also demonstrated that the prawns would accept locally-available feed and that they would accept a habitat not natural to them but at the same time one which would effectively increase the territory available per acre of land covered and one which was more amendable to automatic handling and harvesting operations.

Although but a single embodiment of the present invention has been illustrated and described it will be apparent to those skilled in the art that various changes and modifications may be made therein without departing from the spirit of the invention or from the scope of the appended claims.

What is claimed is:

1. An apparatus for growing and processing crustaceans and fish comprising:

an elongated tank arranged in a substantially horizontal position, a plurality of reefs spacedly arranged in said tank longitudinally thereof, each of said reefs comprising a plurality of tiers spacedly arranged laterally of the longitudinal axis of said tank in a substantially vertical array, said reefs providing a plurality of spaced habitats for the crustaceans and fish, means mounted along the base of said tank longitudinally thereof for aerating the water in said tank, each of said reefs comprising a vertically arranged member extending from the base of the tank toward its top and having a plurality of pairs of shelves extending laterally thereof in a common plane with each pair of shelves forming a substantially horizontally arranged tier, and harvesting means mounted for movement on the top of said tank and along its length for accumulating crustaceans and fish of a predetermined size residing along said tiers at a point in said tank, said harvesting means comprises a boom extending laterally across the width of said tank and having a plurality of brush structures spacedly arranged along its length for extending vertically into said tank toward its bottom one adjacent each of said tiers.

2. An apparatus for growing and processing crustaceans comprising:

an elongated tank arranged in a substantially horizontal position, a plurality of reefs spacedly arranged in said tank longitudinally thereof, each of said reefs comprising a plurality of tiers spacedly arranged laterally of the longitudinal axis of said tank in a substantially vertical array, said reefs providing a plurality of spaced habitats for the crustaceans, means mounted along the base of said tank longitudinally thereof for aerating the water in said tank, and harvesting means mounted for movement on the top of said tank and along its length for accumulating crustaceans of a predetermined size residing along said tiers at a point in said tank, said harvesting means comprising a boom extending laterally across the width of said tank and having a plurality of brush structures spacedly arranged along its length for extending vertically into said tank toward its bottom one adjacent each of said tiers, each of said brush structures comprising a slotted frame extending laterally of the longitudinal axis of said tank and having bristles extending from its periphery for sweeping over the top surfaces of each of the adjacent tiers for moving ahead of it in the direction of its movement all crustaceans that fail to escape through the slots of the frame.

3. The apparatus set forth in claim 2 wherein:

each of said reefs comprises a vertical arranged member extending from the base of the tank toward its top and having a plurality of pairs of shelves extending laterally thereof in a common plane with each pair of shelves forming a substantially horizontally arranged tier.

4. The apparatus set forth in claim 2 wherein:

at least some of said bristles of each of said brush structures extend laterally of the vertically positioned frame across the horizontally arranged tiers.

5. The apparatus set forth in claim 2 wherein:
said frame is formed of a rectangular configuration having a plurality of spacedly arranged bars positioned within its outline to define a plurality of vertically positioned slots when said brush structure is mounted on said apparatus.

6. A method of raising and harvesting crustaceans in fresh water tanks comprising the steps of:
individually placing the crustaceans along a plurality of spaced horizontally arranged vertically positioned tiers thereby forming a separate habitat for each crustacean,
aerating the water in the tank,
periodically feeding the crustaceans, and
periodically grading and harvesting crustaceans only of a predetermined size and larger by moving them along the tiers over all of the habitats existing on that tier to the collecting point.

* * * * *